(No Model.) 5 Sheets—Sheet 1.

J. V. ASH.
BRIDLE BIT MACHINE.

No. 264,430. Patented Sept. 19, 1882.

Attest:
Charles H. Pell
Chas. T. Winters.

Inventor:
Joseph Vail Ash,
by O. Drake, Atty.

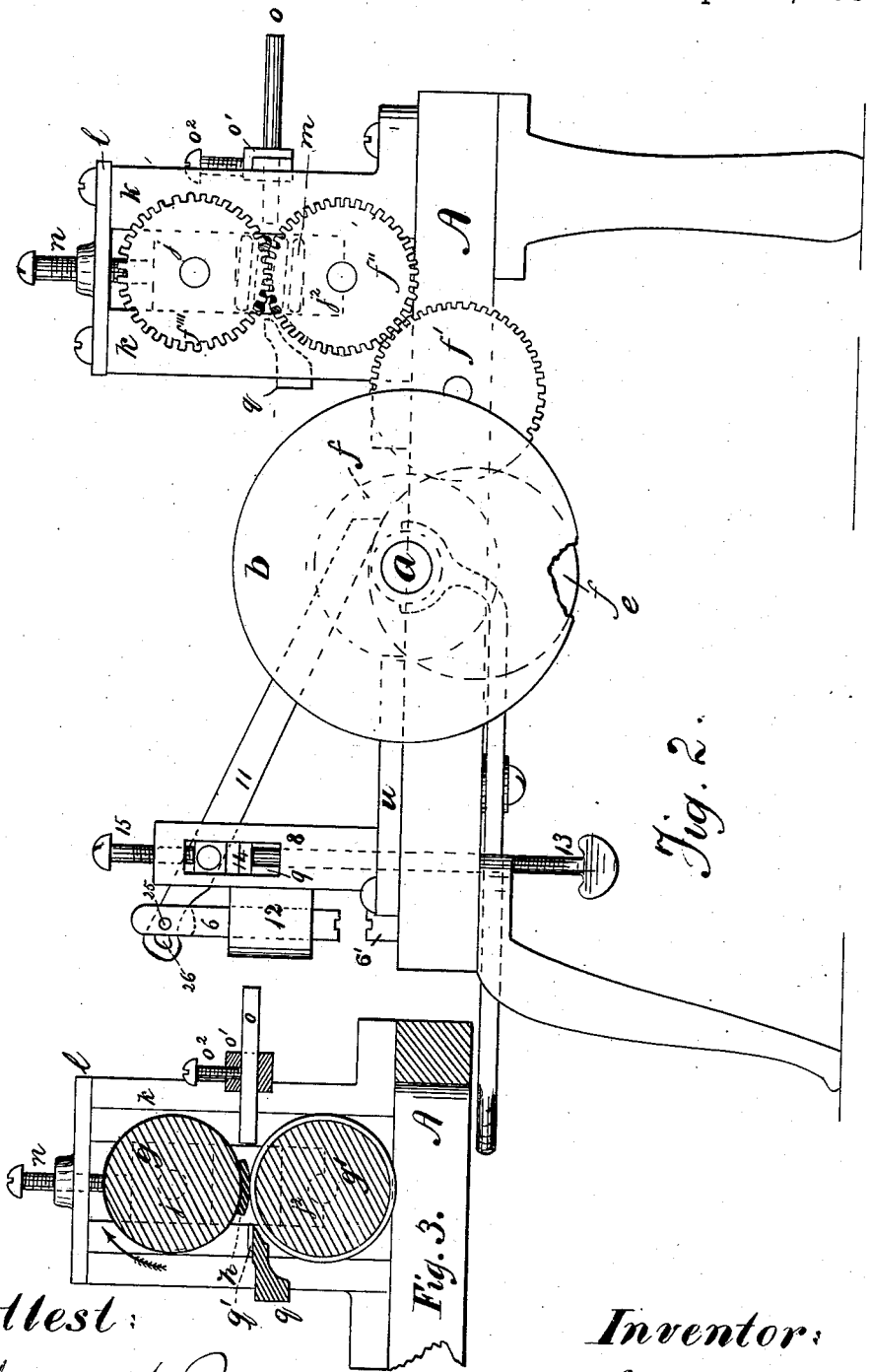

(No Model.)  5 Sheets—Sheet 3.

J. V. ASH.
BRIDLE BIT MACHINE.

No. 264,430.  Patented Sept. 19, 1882.

Attest:
Charles H. Pell
Chas. T. Winters

Inventor:
Joseph Vail Ash, by
O. Drake, atty.

(No Model.)

J. V. ASH.
BRIDLE BIT MACHINE.

No. 264,430.

5 Sheets—Sheet 4.

Patented Sept. 19, 1882.

Attest:
Charles H. Pell
Charles Winters

Inventor:
Joseph Vail Ash, by
O. Drake, Atty.

(No Model.)  5 Sheets—Sheet 5.
J. V. ASH.
BRIDLE BIT MACHINE.
No. 264,430. Patented Sept. 19, 1882.
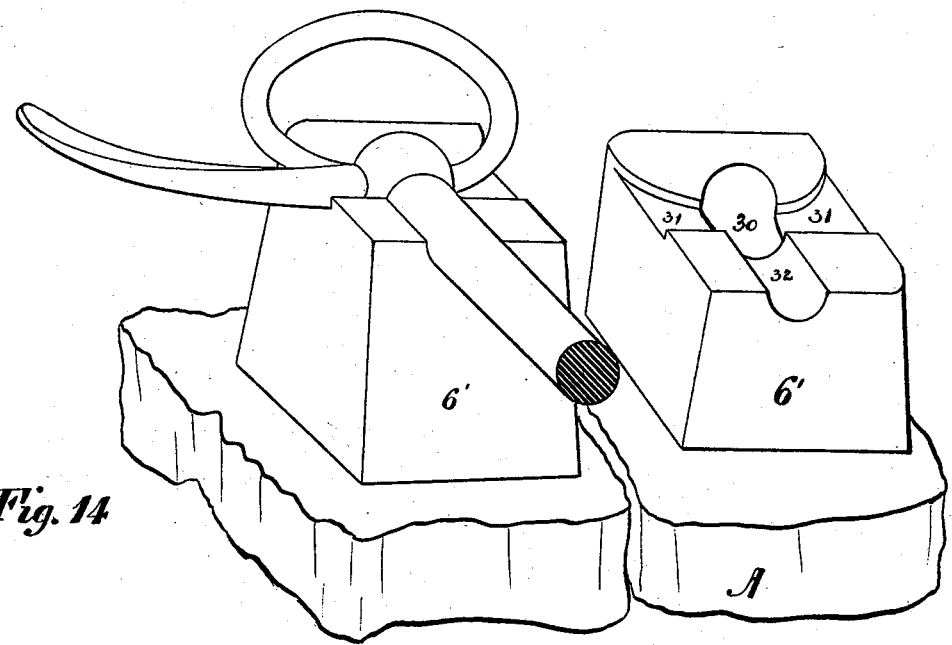
Fig. 14
Fig. 15
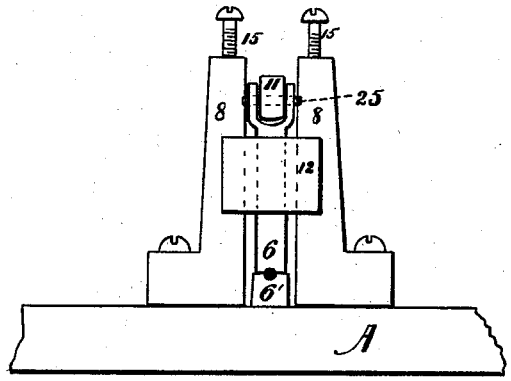
Fig. 16
Attest:
Charles H. Pell
Chas Campbell
Inventor:
Joseph Vail Ash,
by O. Drake, Atty.

UNITED STATES PATENT OFFICE.

JOSEPH V. ASH, OF NEWARK, NEW JERSEY.

BRIDLE-BIT MACHINE.

SPECIFICATION forming part of Letters Patent No. 264,430, dated September 19, 1882.

Application filed December 5, 1881. (No model.)

*To all whom it may concern:*

Be it known that I, JOSEPH V. ASH, a resident of Newark, in the county of Essex and State of New Jersey, have invented certain new and useful Improvements in Bridle-Bit Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to facilitate the operation of constructing bridle-bits and to render the same more durable and uniform.

It consists in the arrangement, combination, and construction of parts, all substantially as will be hereinafter set forth, shown, and finally embodied in the claims.

Figure 1:
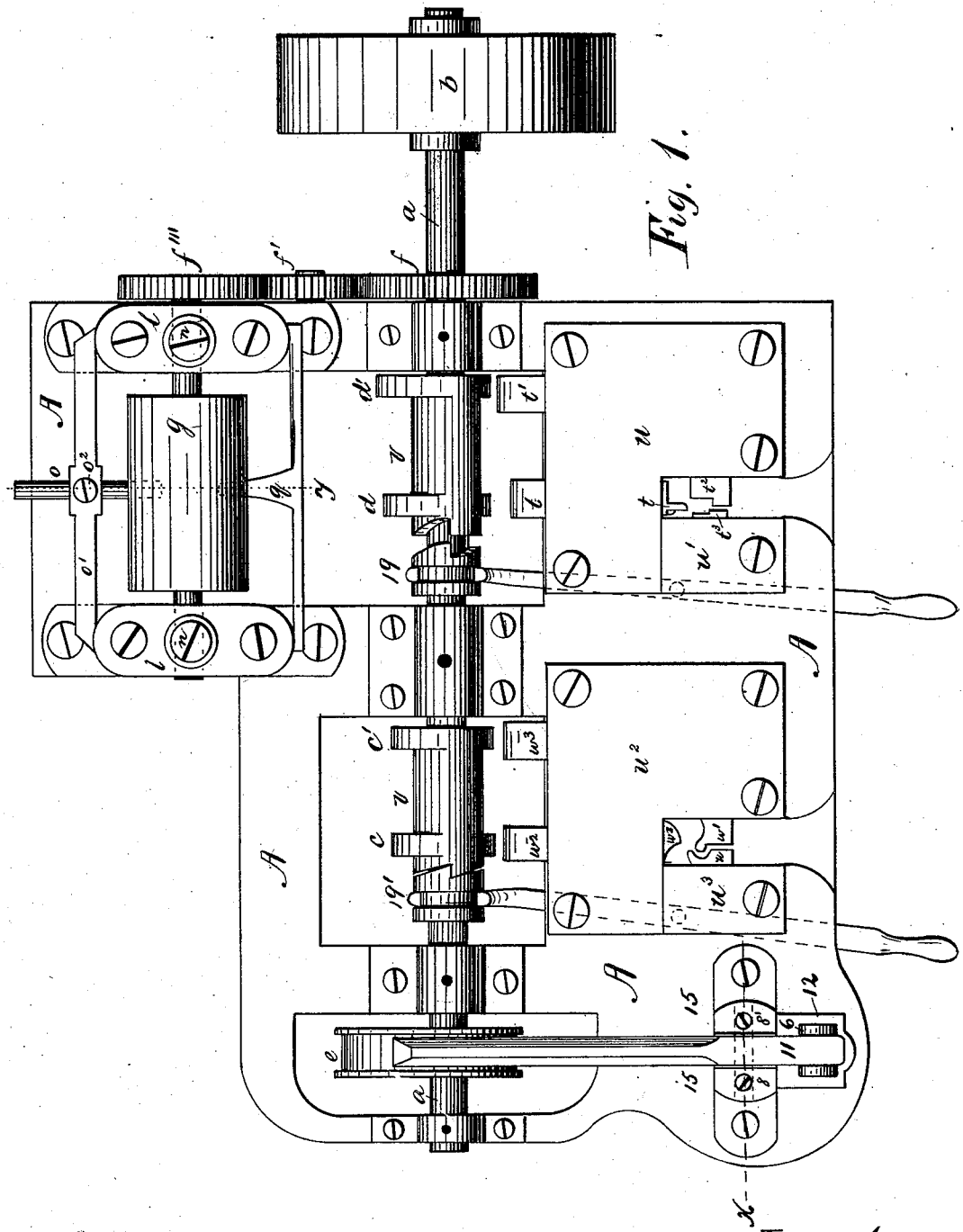
Figure 8:
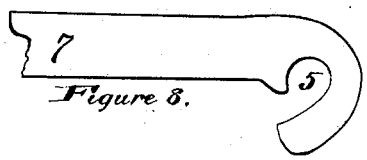
Figure 9:
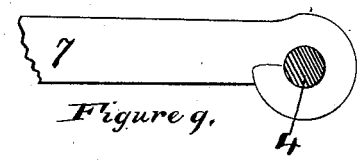
Figure 5:
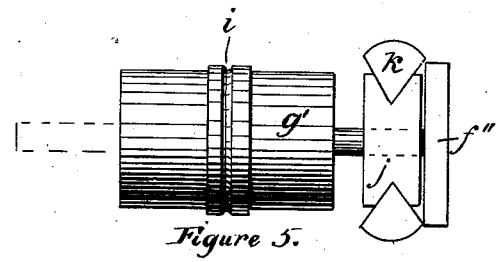
Figure 4:
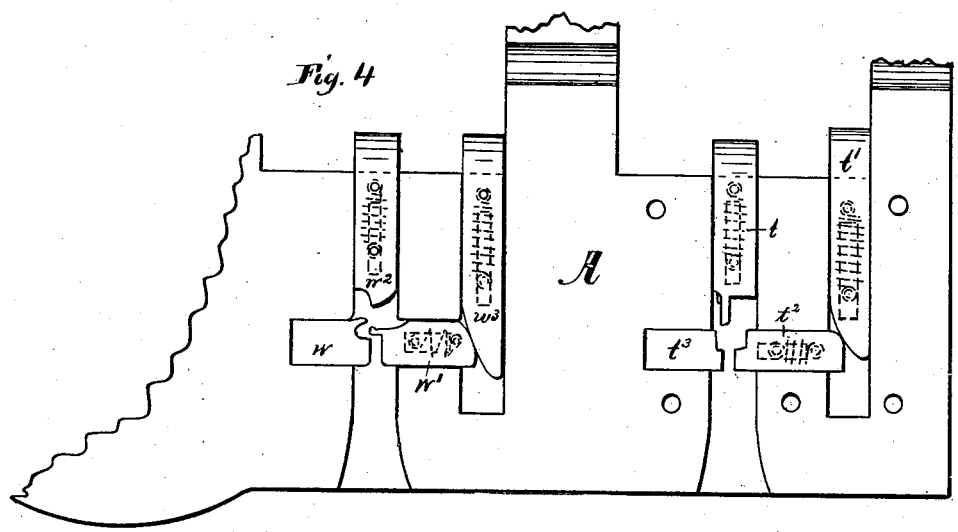
Figure 10:
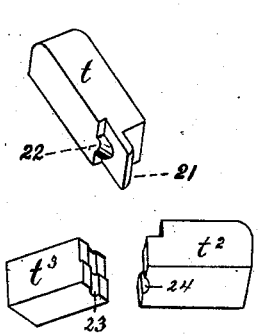
Figure 11:
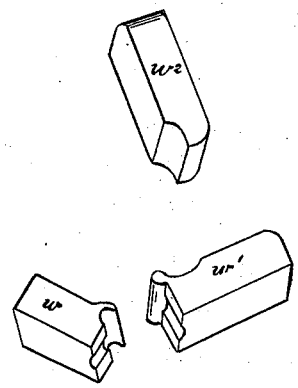
Figure 12:
Figure 13:
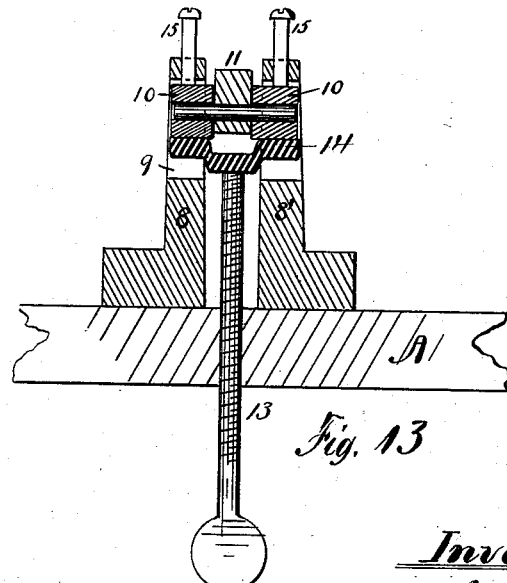

Referring to the accompanying drawings, embodied in five sheets, in which similar letters of reference indicate like parts in each of the several figures, Figure 1, Sheet 1, is a plan view of my device, showing the general relations of the parts. Fig. 2, Sheet 2, is an end elevation; Fig. 3, a section through line $y$, Fig. 1, illustrating more fully and clearly the arrangement and operation of certain rollers or revolving dies used in the process of pressing up the bit. Fig. 4 is a detached plan of a portion of the bed-plate of the machine, illustrating the construction of dies working in grooves therein. Fig. 5 illustrates one of the rollers hereinbefore mentioned, showing clearly a certain peripheral groove therein. Figs. 6, 7, 8, and 9 are several portional views of a bridle-bit, illustrating the same in various stages of completion. Figs. 10 and 11 are perspective views of the above-mentioned dies working in grooves in the bed-plate. Fig. 12 illustrates the plan of certain finishing-dies, and Fig. 13, a section through line $x$, Fig. 1, illustrates more fully the mechanism arranged to render said finishing-dies effective. Figs. 14 and 15 are enlarged perspective views of the under finishing-die, the former figure showing the manner of placing the bit in said die. Fig. 16 is a front elevation of said finishing-dies arranged in connection with my improved means for operating the same. All of said figures will be more fully described hereinafter.

In carrying out my invention I construct the bed-plate A, and upon the same I arrange a driving-shaft, $a$, actuated by power applied to the pulley $b$, which said shaft carries means, as $c\ c'$, $d\ d'$, $e$, and $f$, adapted to actuate the several dies used in the operation of constructing the bit, as will be set forth.

Figure 6:
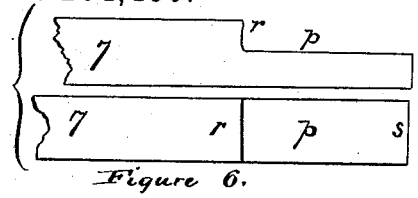

In constructing the bit the first dies used are the rollers $g\ g'$, the former being the male die, having a projecting plate, $h$, thereon, arranged to engage with the bit-iron to form the impressed portion $p$, and the latter the female die, having a peripheral groove, $i$, therein. The bar of metal intended to be worked upon to form the mouth-piece is placed in the groove in said female die, and, projecting above the surface of the roller $g'$, is struck by the plate or male die $h$ and shaped or impressed as shown in Fig. 6, the operation being made clear upon reference to Fig. 3.

The rollers $g\ g'$ are or may be actuated by a train of cogs, $f f'\ f''\ f'''$, connected with the driving-shaft. They (said rollers) work in bearings or boxes $j\ j^2$, which work or slide in the frame $k$, and are so arranged as to allow the rollers to be adjusted in their relation to one another.

Between the upper and lower bearings or boxes $j\ j^2$ is placed a suitable spring, $m$, Fig. 2, which tends to separate the same.

Through the upper plates, $l$, of the frame $k$ are arranged the set-screws $n$, which engage with the boxes $j$ and regulate the rollers as the work may require.

Upon the frame $k$ is secured a gage, $o$, carried by a cross-bar, $o'$, and held at the desired position by the set-screw $o''$. Said gage is adapted to regulate the length of the impression $p$, Fig. 6, by limiting the distance of insertion of the rod between the rollers.

Upon the frame K, at a point opposite the gage $o$, is secured a guide, $q$, having a grooved inner extremity, $q'$, adapted to guide the rod or bar from which the bit is constructed into the groove $i$ in the female die, as will be understood.

It is evident that the position of the described dies $g\ g'$ and their appurtenances may be changed in their position upon the bed-plate as convenience may dictate without departing from the spirit of the invention.

Figure 7:
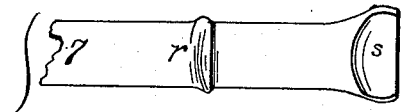

The second operation in the process of constructing the bit is in upsetting the shoulder $r$ and chamfering the extremity $s$, Fig. 6, the result of which process will appear in Fig. 7. This operation is performed by means of the parts $t\ t'\ t^2\ t^3$, working in grooves in the bed-plate A and operated upon by the cams $d\ d'$ on the driving-shafts. Said parts $t\ t'\ t^2\ t^3$ lie flush with the face of the bed, and are held down in position by the plates $u\ u'$, Fig. 1.

Parts $t\ t^2\ t^3$ are dies having their extremities which engage with the bit-iron formed as more clearly shown in detail, Fig. 10. The die $t^3$ lies stationary in its groove or socket in the bed-plate, and is recessed as shown. The bit-iron is placed between it and the co-operating die $t^2$, similarly recessed. The clutch 19 is brought to bear upon the loose collar $v$, carrying cams $d\ d'$, causing the latter to rotate with the shaft. The cam $d$ causes the sliding wedge $t'$ to force the die $t^2$ to co-operate with the die $t^3$ to grasp and hold the bit-iron in the recesses 23 and 24. Immediately following this action the cam $d$ causes the die $t$ to engage with the bit-iron as follows: The tongue 21, Fig. 10, engages with the shoulder $r$, upsetting it, as shown, and the projection 22 engages with the extremity $s$ to form the chamfer, both operations being performed simultaneously. After the cams $d\ d'$ become disengaged from the parts $t\ t'$ the springs beneath said parts $t\ t'\ t^2$ (indicated by dotted lines in Fig. 4) cause the same to react and allow the iron to be taken from the dies. The said iron is then placed in the third set of dies, $w\ w'\ w^2$, and by cams $c\ c'$, carried by a collar, $v'$, and wedge $w^3$, similar in operation to those already described, the portion $p$ is brought around as shown in Fig. 8, the dies $w\ w'$ commencing the operation, as will be clearly seen, the male projection $w'$ forcing the iron into the female die, and the die $w^2$ subsequently striking the iron and continuing the bending process around head or knob on the projection. After the dies separate the iron is removed from the dies and the cheek-piece 4 is placed in position in the eyelet 5, and the whole placed in the last set of dies, 6 6', formed as shown in Fig. 2, by which the circuit of the portion $p$ around the cheek-piece is completed, as shown in Figs. 9 and 14, the said cheek and mouth piece 7 being held in fixed relation with one another, all as will be understood.

The construction and operation of the last set of dies (which are adapted, by having the rounded center recesses, 30, the mouth-piece grooves 32, and lateral recess 31 for the cheek-pieces, as shown in Fig. 15, to bring the mouth-piece, when in the condition shown in Fig. 8 and when the cheek-piece is arranged therein, to the condition shown in Figs. 9 and 14) is as follows: The posts 8 8', having open portions or slots 9 (shown in Figs. 2 and 13) in the same, adapted to receive sliding bearings 10, are first arranged or secured upon the bed-plate A, between which posts is fulcrumed the lever 11, one end of which carries the upper die, 6, and the other end engages with the eccentric or cam $e$ on the driving-shaft. The said die 6 may work in a box, 12, formed on or secured to the posts 8 8', and may be secured to said lever 11 by means of a pin, 25, working in a slot, 26, in said lever. The bearings for the lever 11, which slide in the openings in the posts 8, can be raised or lowered to adjust the dies to the required work by means of the screw 13, working in the bed-plate and bearing upward against the bearing-carrier 14. The downward-bearing screws 15 15 co-operate to make the boxes rigid, as will be apparent.

The machine thus constructed as a whole is adapted to form the bit with comparatively great rapidity and uniformity and at the expenditure of a small amount of power.

Having thus described my invention, what I claim, and wish to secure by Letters Patent, is—

1. In a bridle-bit machine, the dies $t\ t^2\ t^3$, formed, arranged, and adapted to operate in combination substantially as and for the purposes set forth and shown.

2. In a bridle-bit machine, the dies $w\ w'\ w^2$, formed, arranged, and operating in combination substantially as herein set forth and shown, for the purposes specified.

3. In combination, dies adapted to impress the bar, as at $p$, dies adapted to upset the shoulder $r$ and chamfer the extremity $s$, dies adapted to turn the impressed portion $p$, and dies adapted to close said portion around the cheek-piece 4, all substantially as and for the purposes herein set forth and shown.

4. In combination, the dies 6 6', adapted to engage with a mouth and cheek piece to unite the same, the lever 11, and cam $e$, all arranged and operating substantially as and for the purposes set forth and shown.

5. In combination with the bed-plate A, the driving-shaft carrying cams $e\ c\ c'\ d\ d'$, and means, $f$, adapted to actuate the rollers $g\ g'$, said rollers $g\ g'$, dies adapted to upset the shoulder $r$ and chamfer the extremity $s$, dies adapted to turn the portion $p$, and dies actuated by said cam $e$ and lever 11, all arranged and operating substantially as herein set forth and shown.

6. In a bridle-bit machine, the combination, with the dies 6 6', of the lever 11, fulcrumed in adjustable bearings and actuated by the cam $e$, the whole being arranged and operating substantially as and for the purposes herein set forth and shown.

7. In combination, in a bridle-bit machine, the dies 6 6', adapted to unite the cheek-piece with the mouth-piece, as herein set forth, the box 12, posts 8, adjustable fulcrumal bearings 10, lever 11, and cam $e$, all arranged and operating substantially as and for the purposes herein set forth and shown.

8. In combination, in a bridle-bit machine, the dies 6 6', adapted to unite the cheek-piece with the mouth-piece, as herein set forth, the posts 8, bearings 10, lever 11, carrier 14, and set-screws 13 and 15, all arranged and operating substantially as herein set forth and shown.

9. The combination, with the dies $w\ w'\ w^2$ and wedge $w^3$, of the cams $c\ c'$ and clutch 19', all arranged and operating as and for the purposes set forth and shown.

10. The die $t$, having the tongue 21 and projection 22 thereon, adapted respectively to upset the shoulder $r$ and form the chamfer in the extremity $s$ when the bit-iron is held in rigid position for the purpose, substantially as and for the purpose herein set forth and shown.

In testimony that I claim the foregoing I have hereunto set my hand this 19th day of November, 1881.

JOSEPH VAIL ASH.

Witnesses:
OLIVER DRAKE,
CHAS. WINTERS.